United States Patent Office 3,217,942
Patented Nov. 16, 1965

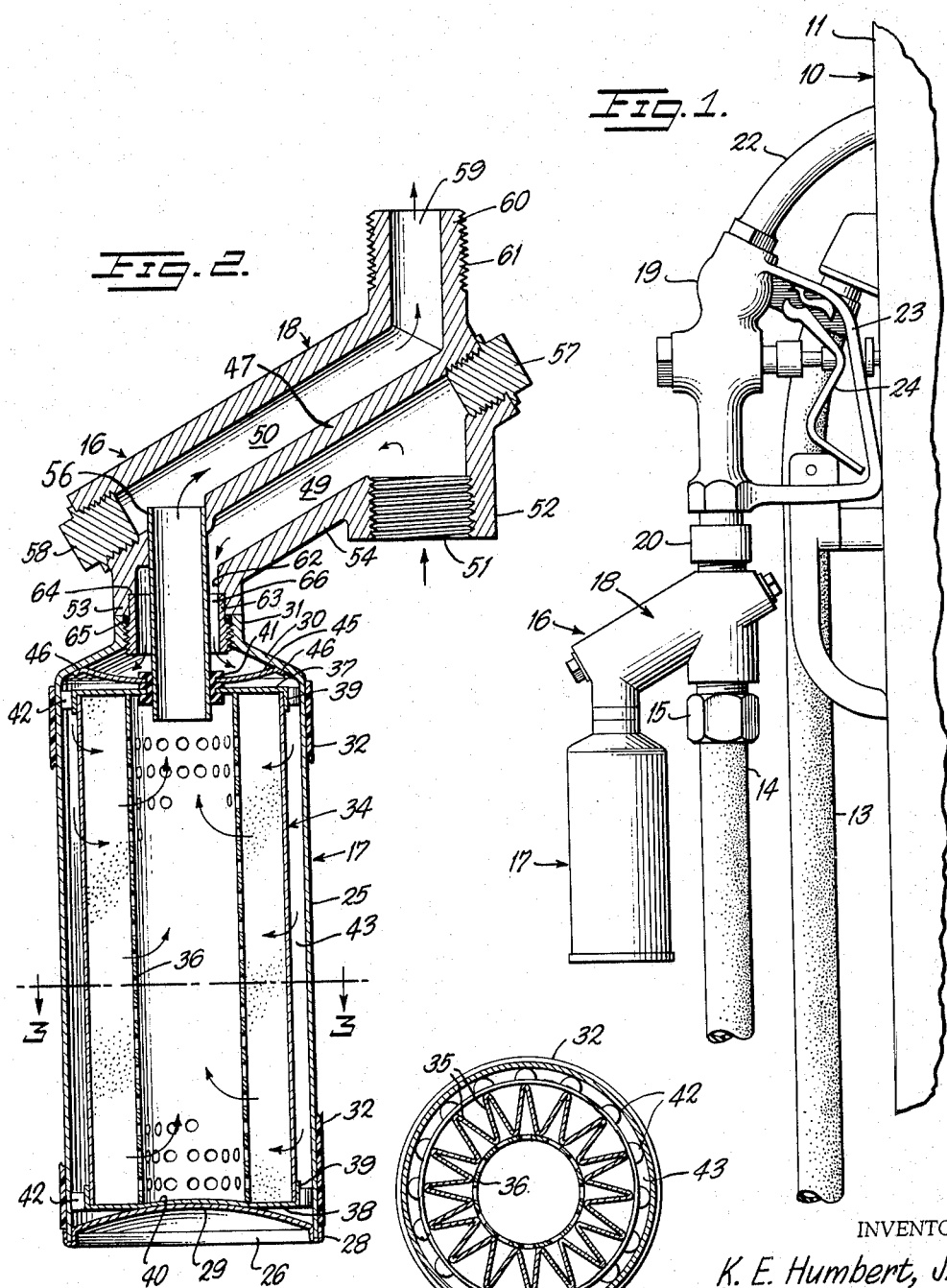

3,217,942
FILTER UNIT
Kingsley E. Humbert, Jr., Gastonia, N.C., and Paul L. Francois, Red Bank, N.J., assignors to Wix Corporation, Gastonia, N.C., a corporation of North Carolina
Filed Mar. 20, 1962, Ser. No. 181,026
9 Claims. (Cl. 222—189)

The present invention relates to a filter unit or assembly and more particularly to one that is adapted to be incorporated in a liquid fuel line or the like.

In accordance with the present invention it is an object to provide means for filtering the liquid or fuel that is normally pumped from a gas pump or stand in a service station into the fuel tank of a passenger vehicle and the like It is, of course, realized that the crude oil from which the refined gasoline is made is normally brought to a refinery and thereafter is processed and refined and is then ready for use to operate vehicles and other types of apparatus such as internal combustion engines. The processed fuel from the refinery must be transported therefrom to what are commonly known as bulk storage depots or stations. Thereafter the fuel from time to time is transported from the bulk storage depot in smaller quantities to the local service or gas station where it is pumped from a tank truck to a vessel or storage tank generally buried in the ground at the station. The fuel is thereafter pumped through the ordinary gas stand or pump and is dispensed from a flexible hose having a valve and nozzle arrangement embodied therein to the individual passenger vehicles or other vehicles as they come into the service station to replenish their supply of gasoline and fill up.

From the foregoing it is obvious that the refined fuel requires considerable handling and transportation with an attendant time interval therein between the time it is refined and the time it is actually dispensed into the fuel tank of the individual passenger vehicle. Because of these factors, the refined fuel will become contaminated with dirt and other particles and even corrosive particles such as metal from the storage tanks. Also the fuel is subject to being contaminated with condensed moisture from storage in the tanks, since the tanks are provided with air vents in communication with the atmosphere.

It is an object of the present invention to filter the fuel immediately before it is dispensed into the supply tank for the internal combustion engine in which it is to be consumed to eliminate all foreign matter such as dirt, scale, condensed moisture, and the like from being dispensed with the fuel into the motor vehicle tank.

It is another object of the present invention to provide a filter assembly in which fuel to be used in internal combustion engines and the like, is filtered as it is actually being discharged from an ordinary gas pump in a local service station, so as to remove all contaminants therefrom and to provide the vehicle with clean fuel.

It is another object of the present invention to filter fuel being dispensed into a fuel tank of a vehicle for use therein so that the foreign matter intermingled in the fuel will not cause damage to the carburetor and other engine parts and will provide more efficient operation of the engine in which the fuel is consumed.

It is a further object of the present invention to provide a filter assembly that has a filter cartridge in circuit with a flexible hose and which can be inexpensively manufactured so that the filter cartridge may be discarded and replaced with a fesh cartridge to provide continuous filtration of fuel being discharged into small fuel tanks, as distinguished from unfiltered fuel generally used heretofore in such a case.

It is another object of the present invention to provide a novel filter assembly having a housing made of inexpensive sheet metal with a paper filter cartridge permanently sealed therein so that the housing and the filter cartridge may be readily discarded and a fresh assembly provided for ensuring filtration of the fuel when it is dispensed into the small fuel tank of a vehicle for immediate use.

It is another object of the present invention to provide a novel inexpensive cannister-type fuel filter having a compounded paper filter element therein in which the cannister is merely unthreaded from the dispensing apparatus and replaced when the filter element becomes clogged.

It is another object of the present invention to provide a combination of a gas stand or gas pump having a flexible hose through which fuel is dispensed, which flexible hose has the filter assembly of the present invention embodied therein so that the purchaser of the fuel may readily observe that the fuel is being filtered as it is pumped or dispensed into the fuel tank of his vehicle.

It is another object of the present invention to provide a filter assembly having a cannister screw-on type housing in which is incorporated a pleated paper filter element that is detachably connected to a body member for insertion in the flexible fuel line normally associated with gas stands and the like.

It is another object of the present invention to provide a compact and inexpensive filter assembly comprising a cannister in which a pleated filter element is sealed, and a body member from which the cannister is readily disassembled so that a fresh filter cartridge may be connected thereto, and in which the body member is readily and detachably connected within the discharge end of a flexible fuel hose ordinarily used with a gas pump or gas tank at the ordinary gas station.

It is another object of the present invention to provide a filter assembly having a cannister type filter in which is permanently disposed a pleated paper filter element which cannister may be readily detached from or connected to a body member by unskilled labor for filtering the fuel being pumped through a flexible hose of a gas stand in which the body member may be disposed and in which the body member is at an angle with the cannister and with the usual dispensing handle of the gas pump so that it will not interfere with an attendant or operator dispensing the fuel into the normal fuel tank of a passenger vehicle.

It is another object of the present invention to provide a filter assembly having a body member with a two-flow pass therethrough having an inlet in communication with the flexible hose normally associated with a gas stand or pump and a discharge outlet in communication with the dispensing nozzle or handle of the gas pump.

It is another object of the present invention to provide a filter assembly and a body member that is readily insertable within the discharge line or the flexible hose line of a gas stand and in which the filter assembly can be readily observed by the purchaser of the fuel so as to ensure the purchaser is receiving a filtered fuel in his passenger vehicle fuel tank.

It is another object of the present invention to provide a filter assembly having a body member with an inlet passage and an outlet passage with the inlet passage having an inlet opening in communication with the flexible hose normally associated with a gas stand and the outlet passage having an outlet in communication with the dispensing nozzle or handle of a gas stand and in which a tubular member is secured to the body member, which tubular member is readily inserted within a cannister type filter detachably connected to the body member for readily replacing the disposable paper filter therein.

It is another object of the present invention to provide a filter assembly for insertion in a fuel line of a fuel dispensing pump, which includes a screw on cannister with a pleated paper filter element therein threaded onto a body structure, whereby fuel cannot be discharged from the fuel line nozzle unless the cannister is screwed onto the body structure.

It is another object of the present invention to provide a novel screw-on type disposable cannister with a sealed in filter element for attachment to a body member insertable within the flexible hose of a gas stand.

It is another object of the present invention to provide a cannister type filter having a threadable neck therein for detachably connecting it to a tubular member secured to a body member that is inserted between the flexible hose member and the handle or dispensing nozzle of an ordinary gas stand.

It is another object of the present invention to provide a throw away type cannister filter member with a pleated filter paper element therein that is threaded onto a body structure connected in the flexible hose discharge line of a gasoline fuel dispensing stand, which body structure is provided with a tubular sleeve member extending therefrom which is insertable into the filter cartridge of the cannister so as to form a liquid seal therewith and in which the inflowing fuel flows around the tubular member in an annular chamber provided between it and the body structure.

It is another onbject of the present invention to provide a novel filter assembly having a cannister type filter detachably connected to a rigid body member in which the body member and the cannister are generally disposed at an angle of inclination with one another so that the cannister will hang down or away from the dispensing handle normally connected to the discharge end of a flexible hose associated with a gas stand, so that it will not interfere with dispensing the fuel into the fuel tank of a passenger vehicle, and especially where the filter pipe or inlet pipe of the fuel tank is disposed in an awkward position as, for example, underneath the licence plate, or behind and within another member in the fender of the vehicle, or in another unexposed or difficult to reach position.

It is another object of the present invention to provide a novel filter assembly of a cannister type and a body member for insertion in the discharge end of the flexible hose of an ordinary gas stand in which the filter element is properly secured in position with the cannister so it cannot come loose therein so that the tubular member associated with the body member may be readily inserted within the cannister and into the filter element therein so as to provide the proper path for the fuel being filtered.

It is still another object of the present invention to provide a novel cannister type filter having a paper filter element permanently sealed therein and which may be detachably connected to a body member inserted within the discharge fuel line of a gas pump, which cannister member may be made of molded material that is inert to the fuel flowing therethrough or which may be covered with a flexible plastic jacket or other molded member so that it will not scratch or mar the vehicle into which the fuel is being pumped, if it is necessary to place the flexible hose of the gas stand across the rear of the vehicle, when the fuel is discharged into the vehicle on the side thereof opposite from the gas stand.

Various other objects and advantages in the present invention will be readily apparent from the following detailed description when considered in connection with the accompanying drawing forming a part of and in which:

FIG. 1 is a fragmentary side elevational view of a gas stand embodying the filter unit of the present invention and FIG. 2 is an enlarged sectional detailed view of the filter assembly and body member associated with and used in the combination of the present invention and FIG. 3 is a transverse section through the cannister type filter taken along lines 3—3 of FIG. 2.

Referring to the drawings, the reference numeral 10 generally designates a gas stand or a service pump commonly used in present-day gasoline or service stations. The portion 11 is generally square in configuration and is a vertical member normally being painted with a brilliant color designating the particular type of fuel that a service station sells. The upper side of portion 11 is provided with a fuel dispensing hose 13 that is flexible. The hose may be made of rubber or other flexible material such as plastic composition upon which the fuel being pumped therethrough will have no deleterious effects. The discharge end 14 of the flexible fuel hose is provided with a threaded connection 15 to which is detachably connected the filter unit 16 of the present invention. The component parts of the filter assembly or unit comprise a cannister type filter 17 and a body structure 18.

A dispensing handle 19 is threadably connected by a fitting or connector 20 to the filter assembly as is best seen in FIG. 1. The dispensing handle 19 is provided with a discharge nozzle 22, a frame member 23 and a valve actuating lever 24 for shutting off and opening the valve (not shown) disposed within the handle 19, in order to control dispensing of fuel into a tank from the pump stand 10. The pump stand 10 and the handle and nozzle and the flexible hose and the fittings 15 and 20 do not per se form the present invention, as they are well known and widely used at the present time in service stations throughout the country. It is also realized of course that the pump stand 10 generally incorporates a pumping unit, so that the fuel may be discharged through the pump from the fuel storage tank located or buried in the ground of the service station, and the other mechanism is associated with the stand 10 such as the price of the fuel being pumped, the number of gallons, and so on, all of which are well known and do not form any part of the invention.

As has already been stated since the fuel received at the local service station requires much handling and transportation between its original source, namely the refinery where it is processed, and the time the fuel is pumped into a vehicle that is drawn alongside of the gas stand 10 for replenishing the fuel supply, it will have an inordinate amount of contaminants therein which will be discharged into the vehicle fuel tank along with the supply of fuel, unless these contaminants are removed from the fuel as the gasoline or fuel is being dispensed. The filtration of the fuel at this point and at this time ensures the engine of the vehicle being supplied with the cleanest fuel available, and hence avoids any damage to the carburation system and to the other engine parts to eliminate and drastically reduce the cost of maintainence of the vehicle, and to ensure proper and efficient operation thereof.

The filter unit 17 comprises a sheet metal cylindrical can 25 with a bottom closure member 26 secured to the lower edge of the cylindrical can portion 25. The bottom 26 preferably has a rolled-over seam 28 forming a liquid tight seal with the cylindrical body portion 25. If desired the rolled-over seam 28 may be provided with cement, or it may be brazed or any other similar means may be used to provide a liquid tight seal. The bottom member 26 has a dome shaped configuration so that a cup portion 29 extends upwardly into the end of the cylindrical can 25, as shown in FIG. 2 for seating a filter element thereon, as hereinafter described. A molded plastic sleeve or jacket 32 is preferably secured around the metal can between the top and bottom thereof, a fragmentary portion of said sleeve being illustrated in FIGS. 2 and 3. The filter element 34 permanently sealed within the casing or cannister 25 comprises a resin impregnated pleated paper material having a plurality of radially extending longitudinal pleats or convolutions 35 disposed in an annulus about a perforated center tube 36. The upper and lower edges of the plates 35 are sealed off by circular end caps for discs 37 and 38 having turned-in rims 39.

The end caps are preferably made of metal, the bottom end cap 38 being provided with a bowed central section 40 which completely closes off the bottom of the center tube. The upper end cap 37 is provided with a central opening therein to receive a cylindrical sealing gasket or member 41 made of rubber or other resilient material. The sealing gasket 41 has two spaced peripheral recesses therein, and the end cap 37 has the inner edge thereof adjacent the center tube extending into the lower recess of the sealing gasket.

The end caps are provided with spaced circumferential ribs or flutes 42 (see FIG. 3) around the outer periphery thereof so that the filter element is properly positioned within the cannister 25 in spaced relationship with the inner surface of the casing 25 to provide an annular flow chamber 43 around the filter element for permitting fuel or other liquid to flow through the filter element in an outside-in direction, as indicated by the arrows in FIG. 2. The lower end of the filter element as at 40 is pressed against the bowed surface 29 of the closure member so that the filter element is permanently secured in a predetermined position in cannister 25.

A resilient spacer member 45 which consists of a plurality of radially spaced fingers or a spider member prevents the filter element from moving longitudinally of the casing 25. The spider member 45 is provided with a central opening therein. The edge of the spider about the central opening is disposed in the upper circumferential recess of the sealing gasket 41 as clearly seen in FIG. 2. The outer ends 46 of the resilient fingers of the spider member are pressed against the inner surface of the top of cannister 25 so that the filter element is permanently disposed in a predetermined position within the cannister. The fuel or liquid flows into the cannister by flowing through the neck portion 31 as indicated by the arrows in FIG. 2, and thereafter between the individual fingers of the resilient member 45 and between the ribs 42 into the annular chamber 43, thereafter flowing through the filter element to deposit any contaminants and dirt thereon on the upstream side of the pleats.

The body structure 18 of the present invention, which is designed to be interposed between and connect the discharge end 14 of the fuel hose 13 and discharge nozzle 22, comprises an elongated tubular part provided with a partition 47 disposed centrally thereof dividing it into an inlet flow passage 49 and an outlet or discharge flow passage 50. A threaded inlet opening 51 is provided adjacent the right end of flow passage 49 by a downwardly extending vertically disposed boss 52 having internal threads therein. The opposite end of passage 49 is provided with a downwardly extending vertically disposed cylindrical filter mounting member or boss 53 for passing liquid that enters inlet 51, into the cannister 25. The boss 52 is positioned on the body structure 18 in a plane above the horizontal plane passing through boss 53 so that the portion 54 extending between the bosses 52 and 53 is included upwardly, or in other words the tubular part of the body 18 is formed at an angle with respect to the bosses 52 and 53 as clearly shown in FIG. 2. In FIG. 2 the tubular part of the body member is disposed at approximately a 45° angle with a horizontal plane extending therethrough. The lower end of partition 47 is provided with an opening therein and a vertically disposed tubular sleeve or member 56 is secured in said opening in a liquid-tight relationship. The lower end of the tube 56 extends through and a substantial distance below the boss filter mounting 53 so that the tubular member 56 may extend into the cannister 25 and through the gasket member 41 in a liquid tight relationship with the latter as shown in FIG. 2. The upper end of the inlet flow passage 49 is provided with an opening in which a plug 57 is secured, which may be removed for cleaning out the flow passage 49.

The lower end of the flow passage 50 is provided with an opening in which a plug 58 similar to plug 57 is secured for cleaning out this passage. The upper end of the flow passage 50 terminates in a vertical passage 59 defined by an upwardly extending vertically disposed member or boss 60 having external threads 61 thereon. The boss 60 has a smaller inside diameter than the inside diameter of boss 52 and the vertical axis extending through both of these bosses are substantially in alignment with one another. The tubular member 56 has an outside diameter that is substantially less than the inside diameter of the boss 53 so that an annular outflow passage 62 is provided therearound.

An internal adaptor or bushing 63 is secured to the lower end of the boss 53 and seats against a shoulder 64 provided in boss 53. Bushing 63 is provided with an external thread adjacent the lower portion thereof and has an O-ring seal 65 mounted on it between its threads and the lower edge of the boss 53 so as to form a liquid tight seal. The inside diameter of the externally threaded bushing 63 has a larger diameter than the external diameter of a tubular member 56 so than an annular flow chamber 66 of the same diameter as chamber 62 is provided to permit the flow of liquid from inlet passage 49 around the outside of the tubular member 56 with the top of the cannister 25.

It will be noted that the substantially parallel vertically disposed boss 53 and the discharge boss 60 form an angle with the main portion of the body structure 18.

The filter 17 is detachably connected to the body structure 18 by threading the neck portion 31 onto the bushing 63 after first making sure that the lower end of the tubular member 56 is properly inserted through the central opening of the gasket 41 as shown in FIG. 2. When the cannister 25 has been threaded home on the bushing 63 with the tubular member 56 forming a liquid tight seal with the gasket 41 as shown in FIG. 2 the filter element is properly positioned to filter any fuel that may be pumped through the flexible hose 13.

The body structure 18 is connected in the discharge line 13 of the gas pump 10 by properly connecting the bosses 52 and 60, or threadably engaging the bosses 52 and 60, with the connector members 15 and 20 respectively as shown in FIG. 1. Thereafter when it is decided to pump gasoline from the stand 10 into the small fuel tank of a passenger vehicle drawn up alongside of the stand, the fuel passes through the line or hose 13, into boss 52, through inlet passage 49 and chambers 62 and 66 into the cannister flowing into chamber 43 and through the filter element 34. The filtered fuel then passes through the center tubular member 56 and is discharged through outlet 50 and boss 59 from the body structure. The filtered fuel then flows through the handle 19 and nozzle 22 into the filter pipe and fuel tank of the vehicle.

Thus the present invention provides a novel filter assembly including a detachably connected cannister type filter casing connected to a body structure which body member may be readily connected with the discharge hose of a gas pump for filtering fuel as it is being discharged into the small fuel tank of a vehicle. Thus any contaminants, dirt, scale, or the like, which may have gotten into the fuel from the time it is refined at the refinery, may be removed therefrom so as not to contaminate the carburation system of a vehicle. In addition, it is obvious that the present invention provides a novel filter assembly including a cannister type throw away filter element and a body structure which can be connected in a discharge hose line of a gas stand by unskilled labor and which is readily observed by a purchaser so that he knows he is receiving filtered fuel.

It is also apparent from the present invention that the body structure when utilized in the gas hose line of a service station is so designed that a filter element must be attached to it in order to ensure filtering of the fuel or the fuel will be pumped on the ground.

The present invention further provides a novel body structure that is disposed at an oblique angle to the oppositely directed aligned inlet and the outlet bosses whereby such bosses may be inserted in a fuel hose line in alignment with the handle and the hose, while the main portion of the body structure is disposed at an angle thereto so that the filter unit attached to the structure will not interfere with the operator dispensing the fuel into a gas tank.

The present invention further provides a novel moldable plastic material encasing the metal cannister containing the discardable filter element therein so as not to mar the surface of the automobile or vehicle into which the fuel is supplied.

Inasmuch as changes may be made in the form, location, and relative arrangement of the several parts of the invention, without departing from the principles of the invention, it will be understood that the invention is not to be limited except by the scope of the appended claims.

We claim:

1. A structure for supporting a filter unit in circuit in a fluid line, said structure comprising an elongate body having longitudinal inflow and outflow passages separated by a longitudinal partition, a tubular inflow boss at one end of said body and leading into said inflow passage, a tubular outflow boss at said one end of the body and communicating with said outflow passage, said bosses projecting in opposite directions from the body and being substantially in axial alignment, a tubular filter mounting boss at the other end of said body and leading from said inflow passage, a tube having an end fixed in said partition at said other end of the body and opening at said fixed end into the outflow passage and extending through and projecting a substantial distance beyond the end of said filter mounting boss, said tube having an outside cross-sectional area less than the inside diameter of the filter mounting boss providing a flow passage leading outwardly through the mounting boss, means for attaching a filter unit to said filter mounting boss for supplying fluid to a mounted filter by way of said flow passage, said tube conducting filtered fluid back from the mounted filter to said outflow passage, and said filter mounting boss being in substantially parallel relation to said inflow and outflow bosses and said body between the bosses at the ends thereof extending obliquely to the length of the bosses.

2. The invention as defined by claim 1 wherein said filter attaching means comprises a bushing having an end secured in said filter mounting boss and projecting beyond the adjacent end of the boss and being externally screw threaded in the projecting portion, said bushing having the same inside cross-sectional area as the mounting boss and having a smaller outside cross-sectional area than the mounting boss.

3. The invention as defined by claim 1, wherein said inflow passage at the end thereof adjacent to said inflow boss, and the outflow passage at the end thereof adjacent to said filter mounting boss are closed by removable cleanout plugs.

4. A combined fuel dispensing and filtering apparatus comprising a flexible hose having a discharge end, an elongate filter unit, and a structure for supporting the filter unit in fluid circuit with said hose, said structure comprising an elongate body having longitudinal inflow and outflow passages separated by a longitudinal partition, a tubular inflow boss at one end of said body and means to connect said hose discharge end thereto for leading fuel from the hose into said inflow passage, a tubular outflow boss at said one end of the body and opening into said outflow passage, a valve controlled discharge nozzle including means connecting said discharge nozzle with said outflow boss, said bosses projecting in opposite directions from the body and being in substantially axial alignment, a tubular filter mounting boss at the other end of said body and leading from said inflow passage, said mounting boss being axially substantially parallel with the aligned axes of the inflow and outflow bosses and extending from the body in the same direction as the inflow boss, the body in the part thereof between the first mentioned bosses and the filter mounting boss extending obliquely to said axes, a tube having an end fixed in said partition at the said other end of the body and opening at the fixed end thereof into the outflow passage, said tube extending through and projecting a substantial distance at its other end beyond the adjacent end of the filter mounting boss, means attaching the filter unit at one end to said mounting boss whereby the filter unit substantially parallels the adjacent hose, said tube having an outside cross-sectional area less than the inside cross-sectional area of the filter mounting boss and providing a flow passage leading outwardly through the mounting boss for conducting unfiltered fluid into the filter unit, and said tube having the projecting portion thereof extending into the mounted filter unit to receive and conduct filtered fluid from the unit to said outflow passage.

5. The invention as defined by claim 4, wherein the oblique disposition of the body is in a direction away from the nozzle and the filter unit also extends away from the nozzle.

6. A support structure for a filter unit of a size to be held in the hand while in use and adapted for placing a hand supported filter unit in fluid circuit with and between a discharge end of a conduit of a liquid fuel dispensing mechanism and a discharge nozzle, said support structure comprising an elongate hollow body, a partition means in and extending longitudinally of and through said body and dividing the body into an inlet flow passage and a discharge flow passage, said inlet flow passage having an intake end, said discharge flow passage having a discharge end, said inlet flow passage having an outlet end, said discharge flow passage having an inlet end, said intake end of the inlet flow passage and said discharge end of the discharge flow passage being at one end of the body, tubular means at and leading into said intake end of the inlet flow passage for attaching to the body a discharge end of a fuel dispensing conduit, tubular means at and leading from said discharge end of the discharge flow passage for attaching to the body of a discharge nozzle, said tubular means at the intake end of the inlet flow passage and the said tubular means at the discharge end of the discharge flow passage being substantially in axial alignment and said body extending oblique to said axial alignment, a tubular boss extending from the other end of the body and having a longitudinal axis substantially parallel to the aligned axes of said tubular means, said tubular boss communicating with the said outlet end of the inlet flow passage, means carried by said tubular boss for attaching an inlet of a filter unit to the body, a tube means extending at one end through said partition means and opening at the said one end thereof into the discharge flow passage at the said inlet end of the latter and extending at its other end through and coaxially with said tubular boss for transmitting filtered liquid from a filter unit to said discharge flow passage, and the said tube means being spaced from the inside of said tubular boss to form an outflow means from said inlet flow passage.

7. The support structure of claim 6 wherein said tubular boss is provided with a threaded bushing secured thereto and plug means are provided in said inlet and discharge flow passages for cleaning out said body.

8. In combination, a flexible fuel hose having an outlet end and a fuel dispensing nozzle carrying handle for use with a fuel service stand, a filter unit supporting structure comprising a tubular member, a partition dividing said tubular member into an inlet flow passage and a discharge flow passage, an inlet connection means detachably connecting said inlet passage to the outlet end of said hose, an outlet connection means detachably connecting said discharge passage to said dispensing handle, said inlet and outlet connecting means being in substantial axial alignment with each other and with said hose and handle and the tubular member extending obliquely to the aligned hose and handle and in a direction away from the handle, means communicating said inlet and discharge flow passages with each other, another connection means in said inlet passage at the opposite end thereof from said first mentioned inlet connection for detachably connecting a filter thereto to filter fuel flowing through said hose, and a tube secured to said discharge flow passage to communicate said inlet and discharge flow passages with each other and said tube extending through and outwardly from said another connection for extension into an attached filter unit, said tube and said another connection having their longitudinal axes parallel to the aligned axes of said inlet and outlet connections.

9. The combination of claim 8 wherein said tube has an outside cross-sectional area substantially smaller than the inside cross-sectional area of said another connection to form an annular flow passage therebetween.

References Cited by the Examiner
UNITED STATES PATENTS

| | | | |
|---|---|---|---|
| 510,420 | 12/1893 | Goff | 285—150 X |
| 2,198,819 | 4/1940 | Holm | 210—304 |
| 2,203,668 | 6/1940 | Burckhalter | 210—443 X |
| 2,881,012 | 4/1959 | Rings | 285—30 |
| 3,066,803 | 12/1962 | Seils | 210—443 X |
| 3,076,550 | 2/1963 | Wilhelm | 210—443 |

REUBEN FRIEDMAN, *Primary Examiner.*

HERBERT L. MARTIN, *Examiner.*